(12) United States Patent
Wada (10) Patent No.: US 8,045,022 B2
(45) Date of Patent: Oct. 25, 2011

(54) IMAGING APPARATUS FOR CORRECTING A LUMINANCE SIGNAL

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 638 days.

(21) Appl. No.: 12/138,334

(22) Filed: Jun. 12, 2008

(65) Prior Publication Data

US 2009/0009637 A1    Jan. 8, 2009

(30) Foreign Application Priority Data

Jun. 12, 2007  (JP) .............................. P2007-155309
Jun. 3, 2008   (JP) .............................. P2008-145697

(51) Int. Cl.
*H04N 9/68* (2006.01)

(52) U.S. Cl. ........ 348/234; 348/235; 348/236; 348/237; 348/238; 348/271; 348/272; 348/273; 348/278; 348/279

(58) Field of Classification Search .......... 348/234–238, 348/271–273, 278–279
See application file for complete search history.

(56) References Cited

U.S. PATENT DOCUMENTS

| | | | |
|---|---|---|---|
| 4,760,441 A * | 7/1988 | Kohno ........................... | 348/278 |
| 5,719,624 A * | 2/1998 | Sasaki et al. ................. | 348/231.3 |
| 6,476,865 B1 * | 11/2002 | Gindele et al. ................. | 348/277 |
| 6,515,698 B1 * | 2/2003 | Sasaki et al. ................. | 348/231.6 |
| 7,362,361 B2 * | 4/2008 | Matsukawa .................... | 348/241 |
| 2002/0041331 A1 * | 4/2002 | Xiaomang et al. ............. | 348/234 |
| 2005/0110882 A1 * | 5/2005 | Fukuda ......................... | 348/234 |
| 2005/0248667 A1 * | 11/2005 | Schweng et al. ............... | 348/234 |
| 2007/0076281 A1 * | 4/2007 | Uchida et al. ................... | 359/24 |
| 2007/0201738 A1 * | 8/2007 | Toda et al. ..................... | 382/144 |
| 2008/0012963 A1 * | 1/2008 | Nanjo et al. .............. | 348/240.99 |
| 2008/0012969 A1 * | 1/2008 | Kasai et al. ................... | 348/266 |
| 2009/0039340 A1 * | 2/2009 | Toda .............................. | 257/21 |
| 2010/0080458 A1 * | 4/2010 | Yamada et al. ............... | 382/167 |

FOREIGN PATENT DOCUMENTS

JP           11-355790 A    12/1999

* cited by examiner

*Primary Examiner* — David Ometz
*Assistant Examiner* — Antoinette Spinks
(74) *Attorney, Agent, or Firm* — Birch, Stewart, Kolasch & Birch, LLP (57) ABSTRACT

An imaging apparatus includes an imaging device, a first luminance signal generating unit and a correcting unit. The imaging device includes at least three types of color detecting photoelectric converting elements and a luminance detecting photoelectric converting element. The first luminance signal generating unit generates a first luminance signal corresponding to the color detecting photoelectric converting element from a color signal obtained from each of the at least three types of color detecting photoelectric converting elements. The correcting unit corrects, based on the color signal, at least a second luminance signal corresponding to the luminance detecting photoelectric converting element which is obtained from the luminance detecting photoelectric converting element so as to generate a luminance signal which constitutes image data corresponding to each of the photoelectric converting elements.

14 Claims, 6 Drawing Sheets

FIG. 7 ably detect a luminance component of a light.

IMAGING APPARATUS FOR CORRECTING A LUMINANCE SIGNAL

CROSS-REFERENCE TO RELATED APPLICATIONS

This application is based on and claims priority under 35 USC 119 from Japanese Patent Application No. 2007-155309 filed Jun. 12, 2007.

BACKGROUND

1. Technical Field

The present invention relates to an imaging apparatus including an imaging device having (i) at least three types of color detecting photoelectric converting elements that detects color components of a light which are different from each other and (ii) a luminance detecting photoelectric converting element that detects a luminance component of a light.

2. Related Art

Patent Document 1 (JP-A-11-355790) has disclosed an imaging device in which (i) a first photosensitive element group having photosensitive elements that respectively detect luminance components of a light arranged in like a square grid and (ii) a second photosensitive element group having photosensitive elements that respectively detect hue components of a light arranged in like a square grid are disposed with a shift into adjacent positions to each other over a silicon substrate and a so-called honeycomb-shaped array pattern is thus formed.

In order to generate image data through the imaging device disclosed in the Patent Document 1, it is necessary to generate a luminance signal corresponding to each of the photosensitive elements. In this case, for a luminance signal corresponding to the photosensitive element of the first photosensitive element group, it is possible to use a signal (a signal A) itself obtained from the photosensitive element. On the other hand, for a luminance signal corresponding to the photosensitive element of the second photosensitive element group, it is necessary to use a signal (a signal B) generated from a signal obtained by the photosensitive element and a signal obtained from the photosensitive element of the second photosensitive element group which is provided therearound.

However, the photosensitive element of the first photosensitive element group and that of the second photosensitive element group have different spectral characteristics from each other. For this reason, a mutual correlation is deteriorated by an object color or a light source. As a result, a level difference is made on the signals A and B and acts as a luminance noise.

In consideration of the circumstances, it is an object of the invention to provide an imaging apparatus capable of reducing a luminance noise.

SUMMARY

[1] An imaging apparatus includes an imaging device, a first luminance signal generating unit and a correcting unit. The imaging device that includes: at least three types of color detecting photoelectric converting elements that detect respective color components of a light, the color components which are different from each other; and a luminance detecting photoelectric converting element that detects a luminance component of the light. The first luminance signal generating unit generates a first luminance signal corresponding to the color detecting photoelectric converting element from a color signal obtained from each of the at least three types of color detecting photoelectric converting elements. The correcting unit corrects, based on the color signal, at least a second luminance signal corresponding to the luminance detecting photoelectric converting element which is obtained from the luminance detecting photoelectric converting element so as to generate a luminance signal which constitutes image data corresponding to each of the photoelectric converting elements.

[2] According to the imaging apparatus of [1], the correcting unit may be a filter processing unit that carries out a filter processing for each of the second luminance signal and the first luminance signal. The filter processing unit may execute, for a luminance signal acting as a processing target, a filter processing for causing a coefficient which is to be multiplied by a luminance signal acting as the processing target to be coincident with a sum of coefficients which are to be multiplied by different types of luminance signals from the luminance signal which are close to the luminance signal acting as the processing target.

[3] According to the imaging apparatus of [2], the first luminance signal may generate the first luminance signal from a weighting addition over the at least three types of color signals with a given luminance generating coefficient. The first luminance signal generating unit may generates the first luminance signal with the given luminance generating coefficient as to minimizes a difference between (i) the luminance signal obtained after the filter processing for the second luminance signal and (ii) the first luminance signal generated when the given luminance generating coefficient is set to have an optimum value. The optimum value may be a value in the case in which the image data are generated by only the color signal obtained from the color detecting photoelectric converting element.

[4] According to the imaging apparatus of [2], the imaging apparatus may further include, a level regulating unit that regulates a level of the color signal constituting the first luminance signal in order to determine a photographing sensitivity before generating the first luminance signal. The first luminance signal generating unit may set the given luminance generating coefficient to have an optimum value when the image data are to be generated by only a color signal obtained from the color detecting photoelectric converting element. The level regulating unit may regulates the level of the color signal by using such a gain as to minimize a difference between a luminance signal obtained after the filter processing for the second luminance signal and the first luminance signal generated with the optimum luminance generating coefficient.

[5] According to the imaging apparatus of [3], a storing unit may store the luminance generating coefficient to minimize the difference every object light source. The first luminance signal generating unit may generate the first luminance signal by using the luminance generating coefficient which (i) corresponds to the object light source and (ii) is stored in the storing unit.

[6] According to the imaging apparatus of [4], a storing unit may store the gain to minimize the difference every object light source. The level regulating unit may regulate the level of the color signal by using the gain which (i) corresponds to the object light source and (ii) is stored in the storing unit.

[7] According to the imaging apparatus of [2], the imaging apparatus may further include regulating unit that regulates the second luminance signal so as to minimize a difference between the luminance signal obtained after the filter processing for the second luminance signal and the first luminance signal generated by the first luminance signal generating unit. The first luminance signal generating unit may sets the given luminance generating coefficient to have an optimum value when image data are to be generated by only a color signal obtained from the color detecting photoelectric converting element.

[8] According to the imaging apparatus of [7], the regulating unit regulates by adding, to the second luminance signal, regulation data. The regulation data is obtained by carrying out a weighting addition, with a given coefficient, over at least three color signals interpolated and generated based on color signals obtained from the at least three types of color detecting photoelectric converting elements respectively in a pixel position corresponding to the second luminance signal acting as a regulating target.

[9] According to the imaging apparatus of [8], the imaging apparatus may further include a storing unit that stores the given coefficient to minimize the difference every object light source. The regulating unit may regulates a level of the second luminance signal by using the given coefficient which (i) corresponds to the object light source and (ii) is stored in the storing unit.

[10] According to the imaging apparatus of [1], the first luminance signal generating unit may generate the first luminance signal by carry out a weighting addition over the at least three types of color signals with a given luminance generating coefficient. The first luminance signal generating unit may set the given luminance generating coefficient to have an optimum value when generating image data through only the color signal obtained from the color detecting photoelectric converting element, the correcting unit may be regulating unit regulates the second luminance signal to minimize a difference between the second luminance signal and the first luminance signal generated by the first luminance signal generating unit.

[11] According to the imaging apparatus of [10], the regulating unit may regulate by adding, to the second luminance signal, regulation data. The regulation data is obtained by carrying out a weighting addition, with a given coefficient, over at least three color signals interpolated and generated based on color signals obtained from the at least three types of color detecting photoelectric converting elements respectively in a pixel position corresponding to the second luminance signal acting as a regulating target.

[12] According to the imaging apparatus of [11], the imaging apparatus may further include a storing unit that stores the given coefficient to minimize the difference every object light source. The regulating unit may regulate a level of the second luminance signal by using the predetermined coefficient which (i) corresponds to the object light source and (ii) is stored in the storing unit.

[13] According to the imaging apparatus of [1], the imaging device may include a first group constituted by the color detecting photoelectric converting elements and a second group constituted by the luminance detecting photoelectric converting elements. Each of the photoelectric converting elements included in the first group, when a position of each of the photoelectric converting elements included in the second group is set to be a reference, is disposed in a position shifted in a given direction from the reference position in such a manner that one of the photoelectric converting elements included in the first group is adjacent to each of the photoelectric converting elements included in the second group.

According to [1] to [13], it is possible to provide an imaging apparatus capable of reducing a luminance noise.

DETAILED DESCRIPTION

An embodiment according to the invention will be described below with reference to the drawings.

First Embodiment

Figure 1:
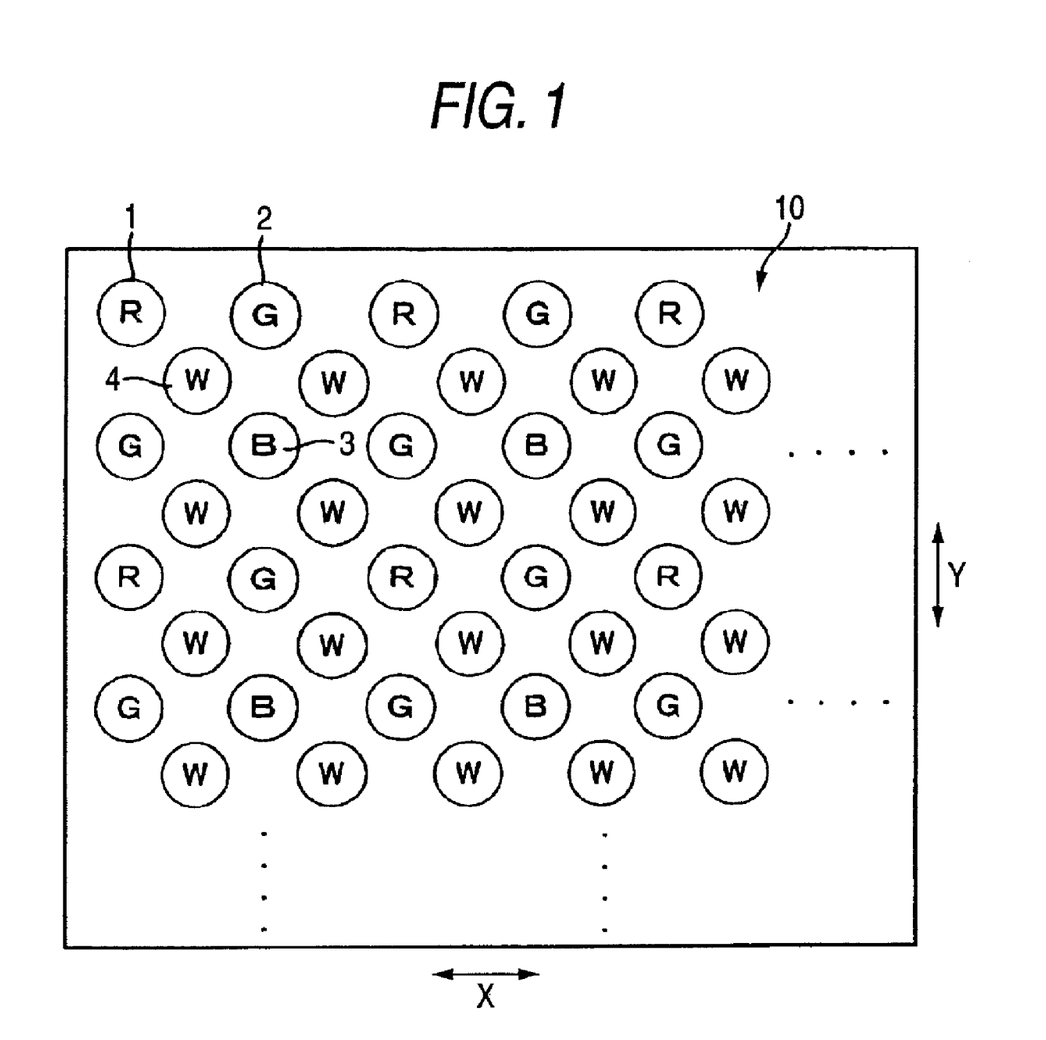
FIG. 1 is a schematically typical plan view showing an imaging element to be mounted on an imaging apparatus according to a first embodiment of the invention.

FIG. 1 is a schematically typical plan view showing an imaging device to be mounted on an imaging apparatus according to a first embodiment of the invention.

An imaging device 10 shown in FIG. 1 includes a first group constituted by a large number of photoelectric converting elements (1, 2, 3) arranged in like a square grid in a row direction X and a column direction Y which is orthogonal to the row direction X over a semiconductor substrate, and a second group constituted by a large number of photoelectric converting elements (4) arranged in like a square grid in the row direction X and the column direction Y over the semiconductor substrate. The numbers of the photoelectric converting elements constituting the first group and the photoelectric converting elements constituting the second group are equal to each other.

In the case in which a position of each of the photoelectric converting elements 4 included in the second group is set to be a reference, each of the photoelectric converting elements included in the first group is disposed in a position shifted from the reference position in a given direction (an obliquely left and upper direction of 45 degrees in the example of FIG. 1) in such a manner that one of the photoelectric converting elements included in the first group is adjacent to each of the photoelectric converting elements 4 included in the second group, and all of the photoelectric converting elements are arranged in like a so-called honeycomb.

The photoelectric converting elements 1 to 4 have identical structures to each other and their detected light components are made different from each other through filters formed above respective light receiving surfaces.

The photoelectric converting element 1 has the light receiving surface provided with an R color filter that transmits a red (R) component of a light and thus functions as a photoelectric converting element that detects the R component of the light. The photoelectric converting element 2 has the light receiving surface provided with a G color filter that transmits a green (G) component of a light and thus functions as a photoelectric converting element that detects the G component of the light. The photoelectric converting element 3 has the light receiving surface provided with a B color filter that transmits a blue (B) component of a light and thus functions as a photoelectric converting element that detects the B component of the light. The photoelectric converting element 4 has the light receiving surface provided with a luminance filter having a spectral characteristic in a correlation with a luminance component of a light and thus functions as a photoelectric converting element that detects the luminance component of the light.

An ND filter, a transparent filter, a white filter or a gray filter and the like corresponds to the luminance filter. Also in a structure in which anything is not provided above the light receiving surface of the photoelectric converting element 4 but a light is directly incident on the light receiving surface, however, it can be supposed that the luminance filter is provided.

A color filter formed above the light receiving surface of each of the photoelectric converting elements in the first group has a Bayer array. In other words, each of the photoelectric converting elements in the first group has an arrangement in which an RG photoelectric converting element row having the photoelectric converting element 1 and the photoelectric converting element 2 arranged alternately in the X direction in this order and a GB photoelectric converting element row having the photoelectric converting element 2 and the photoelectric converting element 3 arranged alternately in the X direction in this order are arranged alternately in the Y direction.

An imaging signal for a red component which is obtained from the photoelectric converting element 1 will be referred to as an R signal, an imaging signal for a green component which is obtained from the photoelectric converting element 2 will be referred to as a G signal, an imaging signal for a blue component which is obtained from the photoelectric converting element 3 will be referred to as a B signal, and an imaging signal for a luminance component which is obtained from the photoelectric converting element 4 will be referred to as a luminance signal Yw.

Figure 2:
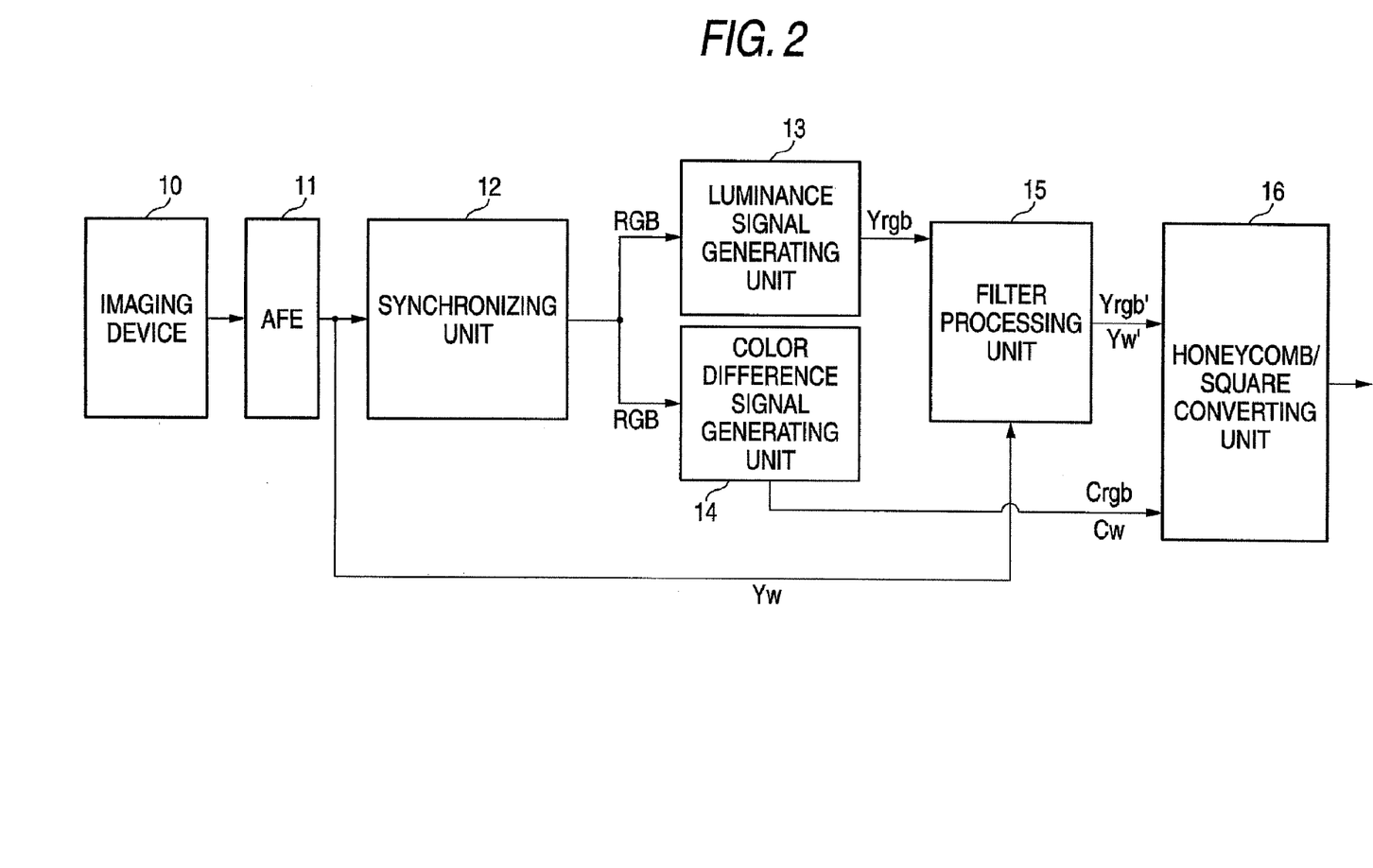
FIG. 2 is a block diagram showing a schematic structure of the imaging apparatus according to the first embodiment of the invention.

FIG. 2 is a block diagram showing a schematic structure of the imaging apparatus according to the first embodiment of the invention.

The imaging apparatus shown in FIG. 2 includes the imaging device 10 shown in FIG. 1, an AFE 11 that carries out a given analog signal processing and digital conversion processing over an analog signal output from the imaging element 10, a synchronizing unit 12 that carries out a synchronization processing which causes an imaging point to have color signals for three colors of R, G and B, a luminance signal generating unit 13, a color difference signal generating unit 14, a filter processing unit 15, and a honeycomb/square converting unit 16 that converts image data having a honeycomb arrangement into a square arrangement.

The AFE 11 also carries out a level regulation processing for multiplying each of the R, G and B signals by a uniform gain, thereby regulating a level of each of the signals. An optimum value is predetermined for the gain to regulate the level corresponding to a photographic sensitivity (ISO) which is set, and the AFE 11 multiplies each of the signals by the gain corresponding to the set ISO sensitivity, thereby regulating the level.

The synchronizing unit 12 carries out a synchronization processing for interpolating and generating a color signal which is not obtained from each of the photoelectric converting elements 1 to 4 on a memory. The color signal is interpolated and generated by using color signals obtained from the surrounding photoelectric converting elements in a pixel position corresponding to each of converting elements 1 to 4 in response to an imaging signal output from the AFE 11, For example, the G and B signals are interpolated and generated by using the G and B signals obtained from the photoelectric converting elements 2 and 3 provided around the photoelectric converting element 1 in a pixel position corresponding to the photoelectric converting element 1, the R and B signals are interpolated and generated by using the R and B signals obtained from the photoelectric converting elements 1 and 3 provided around the photoelectric converting element 2 in a pixel position corresponding to the photoelectric converting element 2, the R and G signals are interpolated and generated by using the R and G signals obtained from the photoelectric converting elements 1 and 2 provided around the photoelectric converting element 3 in a pixel position corresponding to the photoelectric converting element 3, and the R, G and B signals are interpolated and generated by using the R, G and B signals obtained from the photoelectric converting elements 1, 2 and 3 provided around the photoelectric converting element 4 in a pixel position corresponding to the photoelectric converting element 4.

The luminance signal generating unit 13 carries out a weighting addition over the R, G and B signals generated in the pixel positions corresponding to the respective photoelectric converting elements of the first group through given coefficients ($\alpha$, $\beta$, $\gamma$) to generate a luminance signal $Y_{rgb}$ corresponding to the pixel position as is expressed in the following expression (1).

$$\text{Luminance signal } Y_{rgb} = \alpha \times R \text{ signal} + \beta \times G \text{ signal} + \gamma \times B \text{ signal} \quad (1)$$

Optimum values for outputting a color signal from only the first group to generate image data based on the color signal are used for the coefficients $\alpha$, $\beta$ and $\gamma$. The case in which a color signal is output from only the first group to generate image data based on the color signal is the same as the case in which image data are generated based on a signal obtained from a well-known single plate type imaging device in the Bayer array. In other words, the optimum values represent general coefficients ($\alpha=0.3$, $\beta=0.59$, $\gamma=0.11$) to be used for generating the luminance signal from the R, G and B signals when generating the image data based on the signal obtained from the well-known single plate type imaging device in the Bayer array.

Figure 3:
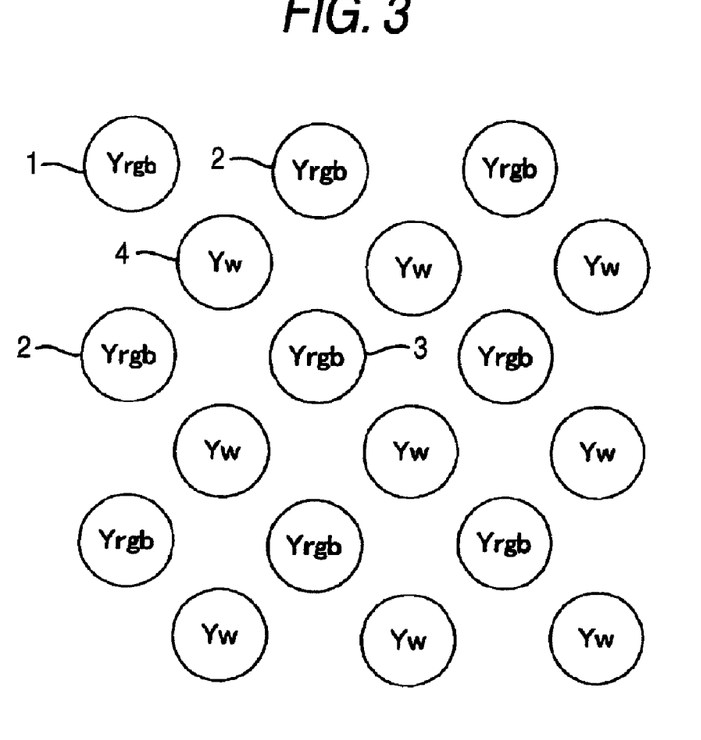
FIG. 3 is a view showing a positional relationship of a generated luminance signal.

By the luminance signal generation processing to be carried out in the luminance signal generating unit 13, data shown in FIG. 3 are stored, on the memory, in the pixel position corresponding to each of the photoelectric converting elements shown in FIG. 1. As shown in FIG. 3, the luminance signal $Y_{rgb}$ generated in the luminance signal generating unit 13 is disposed in the pixel position corresponding to each of the photoelectric converting elements 1, 2 and 3, and the luminance signal $Y_w$ to be the signal itself obtained from the photoelectric converting element 4 is disposed in the pixel position corresponding to the photoelectric converting element 4.

Figure 4:
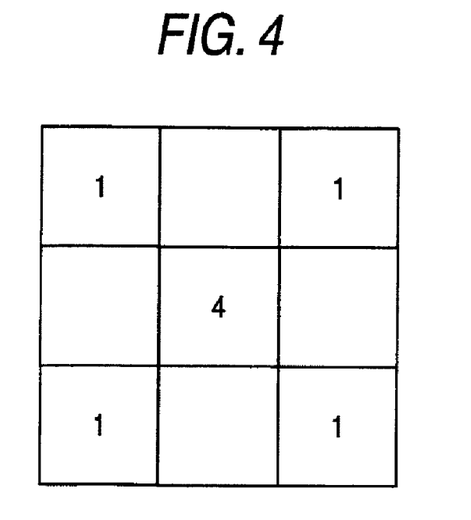
FIG. 4 is a view showing a filter coefficient.

The filter processing unit 15 executes, for the luminance signal present in each of the pixel positions shown in FIG. 3, a filter processing for causing a coefficient which is to be multiplied by the luminance signal to be coincident with a sum of coefficients which are to be multiplied by different types of luminance signals from the luminance signal which are close to the luminance signal. It is possible to use a filter coefficient for carrying out the filter processing as shown in FIG. 4, for example.

For example, in the case in which the luminance signal $Y_w$ in FIG. 3 is set to be a filter processing target, a filter calculation expressed in the following expression (2) is executed based on a filter coefficient shown in FIG. 4 so that a luminance signal $Y_w'$ is generated. The luminance signal $Y_w'$ is one of data constituting the pixel data corresponding to the photoelectric converting element 4.

$$Y_w' = (4 \times Y_w + 1 \times Y_{rgb} + 1 \times Y_{rgb} + 1 \times Y_{rgb} + 1 \times Y_{rgb})/(4+1+1+1+1) = 0.5 Y_w + 0.5 Y_{rgb} \quad (2)$$

In the case in which the luminance signal $Y_{rgb}$ in FIG. 3 is set to be the filter processing target, similarly, a filter calculation expressed in the following expression (3) is executed based on the filter coefficient shown in FIG. 4 so that a luminance signal $Y_{rgb}'$ is generated. The luminance signal $Y_{rgb}'$ is one of data constituting the pixel data corresponding to each of the photoelectric converting elements 1, 2 and 3.

$$Y_{rgb}'=(4\times Y_{rgb}+1\times Y_w+1\times Y_w+1\times Y_w+1\times Y_w)/(4\,1+1+1+1)=0.5Y_{rgb}+0.5Y_w \quad (3)$$

As is apparent from the expressions (2) and (3), by carrying out the filter processings, it is possible to set the luminance signal constituting the pixel data corresponding to each of the photoelectric converting elements shown in FIG. 1 to have a level in which the luminance signal $Y_{rgb}$ generated by the luminance signal generating unit 13 is mixed with the luminance signal $Y_w$ obtained from the photoelectric converting element 4 at a rate of 1.1. This is illustrated in FIG. 5.

Figure 5:
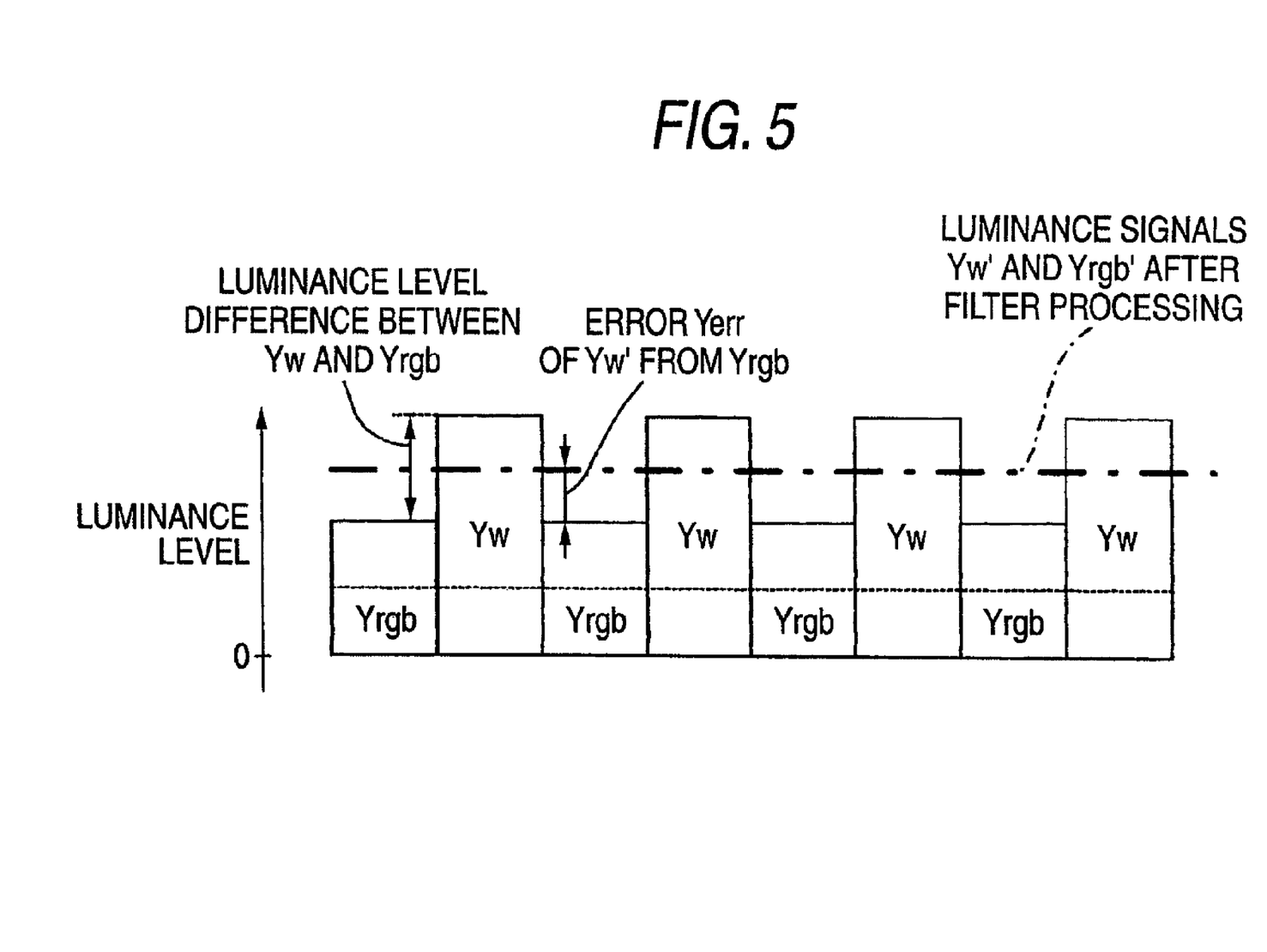
FIG. 5 is a diagram for explaining an effect of a filter processing.

As shown in FIG. 5, in a state brought before the filter processing is carried out, a difference is made between the levels of the luminance signal YW corresponding to the photoelectric converting element 4 and the luminance single $Y_{rgb}$ corresponding to each of the photoelectric converting elements 1, 2 and 3. After the filter processing, the luminance signal corresponding to each of the photoelectric converting elements is averaged as shown in a one-dotted chain line of FIG. 5. Consequently, the difference in the luminance level is eliminated in the pixel position corresponding to the photoelectric converting element 4 and the pixel positions corresponding to the photoelectric converting elements 1 to 3. Therefore, it is possible to reduce a luminance noise.

The color difference signal generating unit 14 generates a color difference signal $C_{rgb}$ from the R, G and B signals generated in the pixel positions corresponding to each of the photoelectric converting elements 1 to 3 and generates a color difference signal $C_w$ from the R, G and B signals generated in the pixel position corresponding to the photoelectric converting element 4. Consequently, pixel data constituted by the luminance signal $Y_w'$ and the color difference signal $C_w$ are present in the pixel position corresponding to the photoelectric converting element 4, and pixel data constituted by the luminance signal $Y_{rgb}'$ and the color difference signal $C_{rgb}$ are present in the pixel position corresponding to each of the photoelectric converting elements 1 to 3.

The honeycomb/square converting unit 16 serves to carry out a processing for interpolating pixel data over a region between the respective photoelectric converting elements from the pixel data in the pixel position corresponding to each of the photoelectric converting elements in FIG. 1 and to convert image data constituted by honeycomb-shaped pixel data into image data constituted by square grid-shaped pixel data, thereby enhancing a resolution. The image data thus converted are compressed and recorded on recording media or are converted into the R, G and B signals to be displayed on a display device.

In addition, honeycomb/square converting may be constituted by a filter processing to be a luminance noise reducing filter. For example, when square grid-shaped pixel data are generated by interpolating pixel data between honeycomb-shaped pixel data, each of pixel data in real pixel positions where each signal presents is generated by the filtering processing in FIG. 4 and each of pixel data in imaginary pixel positions where each signal doesn't represent is generated by taking the average of the signals in left, right, up and down positions adjacent to the no-pixel position, thereby make it possible to set the luminance signals constituting the pixel data which respectively correspond to the pixel data in the real pixel position and the pixel data in the imaginary pixel position to have a level in which the luminance signal $Y_{rqb}$ is mixed with the luminance signal $Y_w$ at a rate of 1:1. As a result, cost reduction as to such as a memory, can be expected by reducing filter circuits.

As described above, according to the imaging apparatus in accordance with the embodiment, the luminance signal $Y_{rgb}$ generated from the color signals obtained from the photoelectric converting elements 1, 2 and 3 for detecting the color components and the luminance signal $Y_w$ obtained from the photoelectric converting element 4 for detecting the luminance component are not exactly used to generate the image data but the image data can be generated by using the luminance signal $Y_w'$ and the luminance signal $Y_{rgb}'$ which are obtained by averaging them. Therefore, it is possible to reduce a luminance noise which is caused by a difference in a spectral characteristic between the photoelectric converting elements 1, 2 and 3 and the photoelectric converting element 4. By employing the signal processing, it is possible to increase the resolution and to enhance picture quality more greatly than in the case in which a signal is read from only the first group to generate image data.

While a large number of photoelectric converting elements included in the first group are constituted by the photoelectric converting elements for detecting three different color components for R, G and B in the description, the color components are not restricted to an RGB primary color system but complementary colors or other colors may be used. In addition, the number of the color components is not restricted to three but may be four or more.

Second Embodiment

In the imaging apparatus according to the first embodiment, it is possible to eliminate the luminance level difference by carrying out the filter processing. On the other hand, in respect of a reproducibility of a luminance, it is preferable that the level of the luminance signal obtained by the filter processing should be as close to that of the luminance signal $Y_{rgb}$ obtained by the optimum coefficient as possible.

The reason is as follows. The luminance signal $Y_w$ is obtained by the photoelectric converting element 4 occupying a half of all of the photoelectric converting elements in the imaging device 10. Although a frequency characteristic (resolution) of the luminance signal $Y_w$ is more excellent than that of the luminance signal $Y_{rgb}$, therefore, it has a poorer luminance reproducibility than that of the luminance signal $Y_{rgb}$. If the filter processing is simply carried out, a difference $Y_{err}$ between the luminance signal $Y_w'$ and the luminance signal $Y_{rgb}$ which is obtained by the filter processing still remains. By reducing the difference $Y_{err}$ to be as small as possible, therefore, it is possible to enhance the luminance reproducibility.

In the imaging apparatus according to the embodiment, the coefficients ($\alpha$, $\beta$, $\gamma$) to be used when the luminance signal generating unit 13 of the imaging apparatus shown in FIG. 2 generates the luminance signal are previously obtained by a method of least squares in such a manner that the error $Y_{err}$ is minimized, and the luminance signal generating unit 13 of the imaging apparatus shown in FIG. 2 generates the luminance signal $Y_{rgb}$ by using the coefficients, thereby implementing an enhancement in a luminance reproducibility. For example, by reducing the level of the luminance signal $Y_{rgb}$ generated by the luminance signal generating unit 13 to the position shown in a broken line of FIG. 5, it is possible to set the level of the luminance signal $Y_w'$ subjected to the filter processing to be almost equal to that of the luminance signal $Y_{rgb}$ obtained with the optimum coefficient. As a result, it is possible to enhance the luminance reproducibility. The coefficients ($\alpha$, $\beta$, $\gamma$) to minimize the difference $Y_{err}$ can be obtained from a signal acquired by photographing a given image before a shipment of a product, for example.

In the imaging apparatus shown in FIG. 2, alternatively, it is also possible to cause the level of the luminance signal $Y_w'$ subjected to the filter processing to approximate to that of the luminance signal $Y_{rgb}$ obtained with the optimum coefficients by (i) maintaining the coefficients ($\alpha$, $\beta$, $\gamma$) to be the optimum values as described in the first embodiment and (ii) changing the gain to be multiplied by each signal in the level regulation of the AFE 11 to have such a value as to minimize the difference $Y_{err}$. As a result, it is possible to enhance the luminance reproducibility. The gain to minimize the difference $Y_{err}$ can be obtained from a signal acquired by photographing a given image before a shipment of a product, for example.

The imaging apparatus according to the embodiment is provided with a white balance correcting unit for multiplying each of the R, G and B signals by a white balance gain to correct a white balance in a former stage of the luminance signal generating unit 13, which is not shown in FIG. 2. The white balance gain is varied every color signal and is changed corresponding to an object light source. For this reason, the white balance correcting unit stores different white balance gains every object light source.

There will be taken, as an example, the case in which the coefficients ($\alpha$, $\beta$, $\gamma$) are changed to minimize the difference $Y_{err}$. If the white balance gain is changed, it is a matter of course that the difference $Y_{err}$ is also varied and the coefficients ($\alpha$, $\beta$, $\gamma$) to minimize the difference $Y_{err}$ are also varied. For this reason, it is preferable that the imaging apparatus should store the coefficients ($\alpha$, $\beta$, $\gamma$) to minimize the difference $Y_{err}$ every object light source and the luminance signal generating unit 13 should read the coefficient corresponding to the object light source which is set and should thus generate the luminance signal $Y_{rgb}$. Consequently, it is also possible to correspond to a change in the object light source.

Moreover, there will be taken, as an example, the case in which the gain in the AFE 11 is changed to minimize the difference $Y_{err}$. If the white balance gain is changed, it is a matter of course that the difference $Y_{err}$ is also varied and the gain to minimize the difference $Y_{err}$ is also varied. For this reason, it is preferable that the imaging apparatus should store the gain to minimize the difference $Y_{err}$ every object light source and the luminance signal generating unit 13 should read the gain corresponding to the object light source which is set and should thus generate the luminance signal $Y_{rgb}$. Consequently, it is also possible to correspond to a change in the object light source.

Third Embodiment

While it is possible to minimize the difference $Y_{err}$ by changing the coefficient or gain to regulate the level of the luminance signal $Y_{rgb}$ generated in the luminance signal generating unit 13 in the second embodiment, the coefficient and the gain are fixed to regulate the level of the luminance signal $Y_w$, thereby minimizing the difference $Y_{err}$ in an imaging apparatus according to the embodiment.

Figure 6:
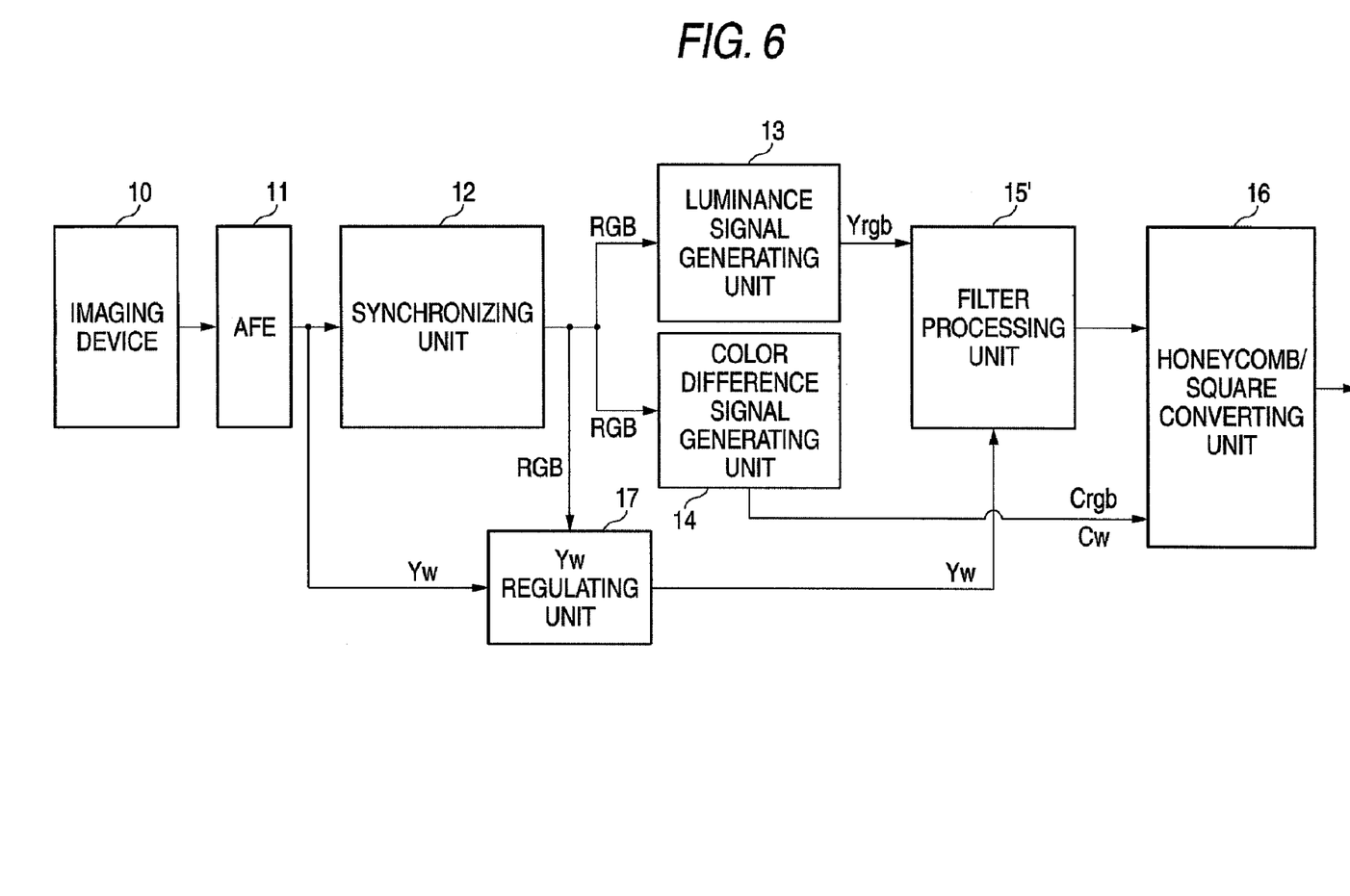
FIG. 6 is a block diagram showing a schematic structure of an imaging apparatus according to a third embodiment of the invention.

FIG. 6 is a block diagram showing a schematic structure of the imaging apparatus according to the third embodiment of the invention. In FIG. 6, the same structures as those in FIG. 2 have the same reference numerals. The imaging apparatus shown in FIG. 6 is obtained by adding a $Y_w$ regulating unit 17 to the imaging apparatus shown in FIG. 2 and changing the filter processing unit 15 into a filter processing unit 15'.

The filter processing unit 15' has almost the same function as that of the filter processing unit 15 and is functionally different from the filter processing unit 15 in that the luminance signal $Y_w$ acting as a filter processing target is a luminance signal $Y_w$ obtained after a level regulation in the $Y_w$ regulating unit 17.

The $Y_w$ regulating unit 17 serves to execute a calculation expressed in the following expression (4), thereby regulating a level of the luminance signal $Y_w$ output from an AFE 11 in such a manner that the error $Y_{err}$ is minimized.

Luminance signal $Y_w$ after regulation=Luminance signal $Y_w$ before regulation+$x \times R$ signal+$y \times G$ signal+ $z \times B$ signal (4)

In the expression (4), R, G and B signals are interpolated and generated in a pixel position corresponding to the luminance signal $Y_w$ acting as a regulating target through a synchronizing unit 12. Moreover, x, y and z represent a weighting coefficient.

The weighting coefficient is previously obtained from a signal acquired when photographing a predetermined image in such a manner that a difference between a luminance signal $Y_w'$ obtained after a filter processing for the luminance signal $Y_w$ obtained after the level regulation and a luminance signal $Y_{rgb}$ is minimized, and is substituted for the expression (4) to regulate the luminance signal $Y_w$. By correcting the luminance signal $Y_w$ with the R, G and B signals constituting the luminance signal $Y_{rgb}$, it is possible to expect the same advantage as that in a correction of the luminance signal $Y_{rgb}$ through the R, G and B signals constituting the luminance signal $Y_{rgb}$.

By previously regulating the level of the luminance signal $Y_w$, thus, it is possible to enhance a luminance reproducibility.

Also in the imaging apparatus according to the embodiment, a white balance correcting unit is provided. In other words, if a white balance gain is changed, it is a matter of course that the difference $Y_{err}$ is also varied and the coefficients (x, y, z) to minimize the difference $Y_{err}$ are also varied. For this reason, it is preferable that the imaging apparatus should store the coefficients (x, y, z) to minimize the difference $Y_{err}$ every object light source and the $Y_w$ regulating unit 17 should read the coefficient corresponding to the object light source which is set and should thus regulate the luminance signal $Y_w$. Consequently, it is also possible to correspond to a change in the object light source.

Fourth Embodiment

Although it is premised that the filter processing is carried out in the first to third embodiments, it is possible to reduce a level difference between the luminance signal $Y_{rgb}$ and the luminance signal $Y_w$, thereby enhancing a luminance noise and a luminance reproducibility even if the filter processing is omitted. A structure in this case will be described below.

Figure 7:
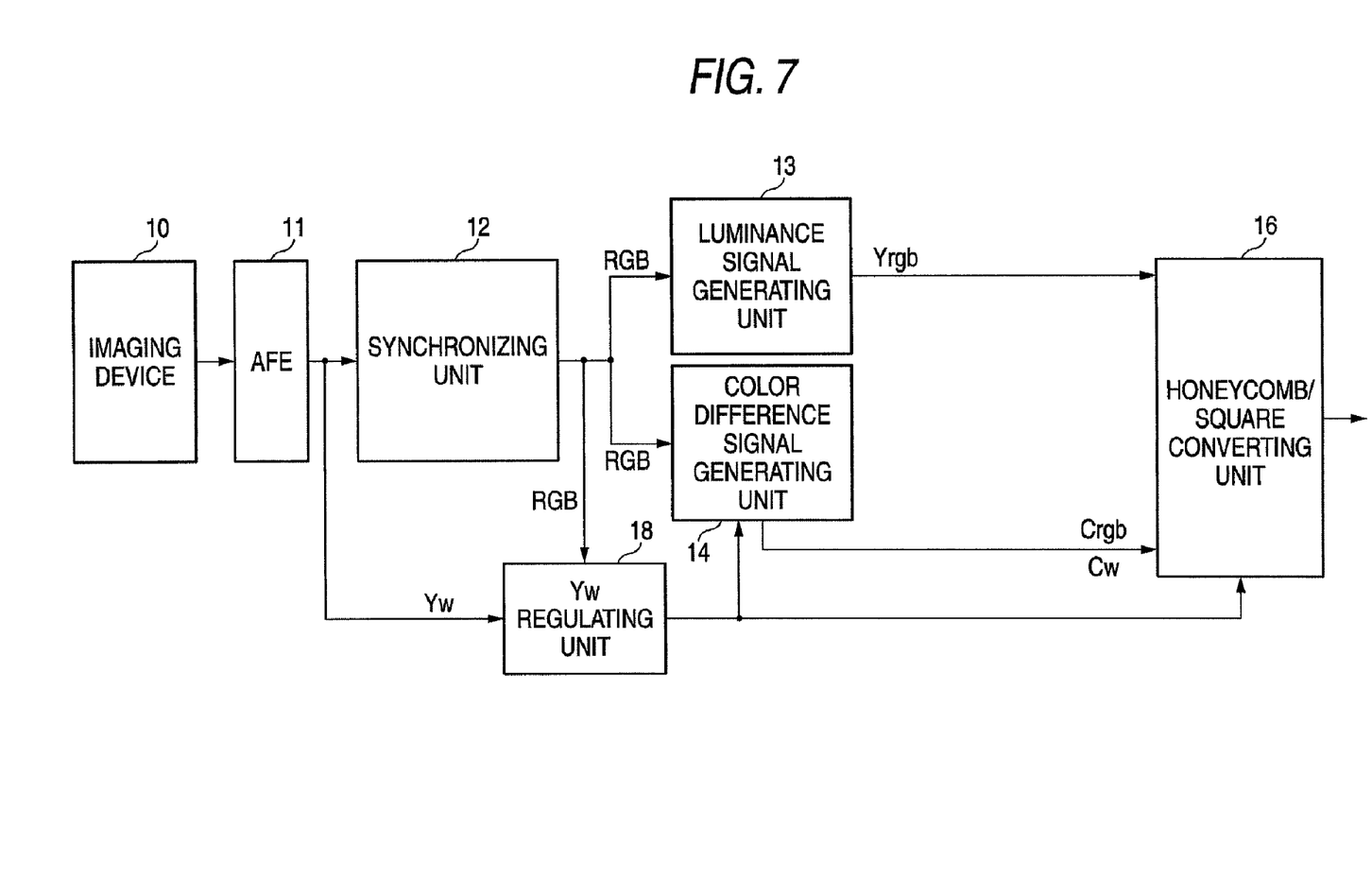
FIG. 7 is a block diagram showing a schematic structure of an imaging apparatus according to a fourth embodiment of the invention.

FIG. 7 is a block diagram showing a schematic structure of an imaging apparatus according to a fourth embodiment of the invention. In FIG. 7, the same structures as those in FIG. 6 have the same reference numerals. In the imaging apparatus shown in FIG. 7, the $Y_w$ regulating unit 17 of the imaging apparatus shown in FIG. 6 is changed into a $Y_w$ regulating unit 18 and the filter processing unit 15' is deleted.

The $Y_w$ regulating unit 18 serves to execute a calculation expressed in the following expression (5), thereby regulating a level of a luminance signal $Y_w$ output from an AFE 11 in such a manner that a difference (hereinafter referred to as a difference S) between the luminance signal $Y_w$ output from the AFE 11 and a luminance signal $Y_{rgb}$ which is output from a luminance signal generating unit 13 and is close to the luminance signal $Y_w$ is minimized.

$$\text{Luminance signal } Y_w \text{ after regulation} = \text{Luminance signal } Y_w \text{ before regulation} + x \times R \text{ signal} + y \times G \text{ signal} + z \times B \text{ signal} \quad (5)$$

In the expression (5), R, G and B signals are interpolated and generated in a pixel position corresponding to the luminance signal $Y_w$ acting as a regulating target through a synchronizing unit 12. Moreover, x, y and z represent a weighting coefficient.

The weighting coefficient is previously obtained from a signal acquired when photographing a predetermined image in such a manner that the difference S is minimized, and is substituted for the expression (5) to regulate the luminance signal $Y_w$.

A color difference signal generating unit 14 generates a color difference signal $C_{rgb}$ from the luminance signal $Y_{rgb}$ and the R, G and B signals and generates and outputs a color difference signal $C_w$ from the luminance signal $Y_w$ obtained after the regulation and the R, G and B signals. In addition, the color difference signal $C_w$ may be generated by signal interpolating processing using the color difference signal $C_{rgb}$.

By simply regulating the level of the luminance signal $Y_w$ in advance without carrying out the filter processing, thus, it is possible to implement a reduction in a luminance noise and an enhancement in luminance reproducibility. According to the imaging apparatus in accordance with the embodiment, moreover, there is an advantage that a resolution can be prevented from being deteriorated by the filter processing.

Also in the imaging apparatus according to the embodiment, a white balance correcting unit is provided. In other words, if a white balance gain is changed, it is a matter of course that the difference S is also varied and the coefficients (x, y, z) to minimize the difference S are also varied. For this reason, it is preferable that the imaging apparatus should store the coefficients (x, y, z) to minimize the difference S every object light source and the $Y_w$ regulating unit 18 should read the coefficient corresponding to the object light source which is set and should thus regulate the luminance signal $Y_w$. Consequently, it is also possible to correspond to a change in the object light source.

What is claimed is:

1. An imaging apparatus comprising:
   an imaging device that comprises:
      at least three types of color detecting photoelectric converting elements that detect respective color components of a light, the color components which are different from each other; and
      a luminance detecting photoelectric converting element that detects a luminance component of the light;
   a first luminance signal generating unit that generates a first luminance signal corresponding to the color detecting photoelectric converting element from a color signal obtained from each of the at least three types of color detecting photoelectric converting elements; and
   a correcting unit that corrects, based on the color signal, at least a second luminance signal corresponding to the luminance detecting photoelectric converting element which is obtained from the luminance detecting photoelectric converting element so as to generate a luminance signal which constitutes image data corresponding to each of the photoelectric converting elements.

2. The imaging apparatus according to claim 1,
   wherein the correcting unit is a filter processing unit that carries out a filter processing for each of the second luminance signal and the first luminance signal, and
   the filter processing unit has a filter having a first coefficient and a second coefficient, the first coefficient is a lied to a luminance signal which is the object of the processing, the second coefficient is applied to luminance signals which are adjacent to the luminance signal, and a sum of the first coefficient is equal to a sum of the second coefficient on the filter.

3. The imaging apparatus according to claim 2,
   wherein the first luminance signal generates the first luminance signal from a weighting addition over the at least three types of color signals with a given luminance generating coefficient,
   the first luminance signal generating unit that generates the first luminance signal with the given luminance generating coefficient as to minimizes a difference between (i) the luminance signal obtained after the filter processing for the second luminance signal and (ii) the first luminance signal generated when the given luminance generating coefficient is set to have an optimum value, and
   the optimum value is a value in the case in which the image data are generated by only the color signal obtained from the color detecting photoelectric converting element.

4. The imaging apparatus according to claim 2, further comprising:
   a level regulating unit that regulates a level of the color signal constituting the first luminance signal in order to determine a photographing sensitivity before generating the first luminance signal,
   wherein the first luminance signal generating unit sets a given luminance generating coefficient to have an optimum value when the image data are to be generated by only a color signal obtained from the color detecting photoelectric converting element, and
   the level regulating unit regulates the level of the color signal by using such a gain as to minimize a difference between a luminance signal obtained after the filter processing for the second luminance signal and the first luminance signal generated with the optimum luminance generating coefficient.

5. The imaging apparatus according to claim 3, further comprising:
   a storing unit that stores the luminance generating coefficient to minimize the difference every object light source,
   wherein the first luminance signal generating unit generates the first luminance signal by using the luminance generating coefficient which (i) corresponds to the object light source and (ii) is stored in the storing unit.

6. The imaging apparatus according to claim 4, further comprising:
   a storing unit that stores the gain to minimize the difference every object light source,
   wherein the level regulating unit regulates the level of the color signal by using the gain which (i) corresponds to the object light source and (ii) is stored in the storing unit.

7. The imaging apparatus according to claim 2, further comprising:
   regulating unit that regulates the second luminance signal so as to minimize a difference between the luminance signal obtained after the filter processing for the second luminance signal and the first luminance signal generated by the first luminance signal generating unit, wherein the first luminance signal generating unit sets the given luminance generating coefficient to have an optimum value when image data are to be generated by only a color signal obtained from the color detecting photoelectric converting element.

8. The imaging apparatus according to claim 7, wherein the regulating unit regulates by adding, to the second luminance signal, regulation data,
the regulation data is obtained by carrying out a weighting addition, with a given coefficient, over at least three color signals interpolated and generated based on color signals obtained from the at least three types of color detecting photoelectric converting elements respectively in a pixel position corresponding to the second luminance signal acting as a regulating target.

9. The imaging apparatus according to claim 8, further comprising:
a storing unit that stores the given coefficient to minimize the difference every object light source,
the regulating unit regulates a level of the second luminance signal by using the given coefficient which (i) corresponds to the object light source and (ii) is stored in the storing unit.

10. The imaging apparatus according to claim 1, wherein the first luminance signal generating unit generates the first luminance signal by carry out a weighting addition over the at least three types of color signals with a given luminance generating coefficient,
the first luminance signal generating unit sets the given luminance generating coefficient to have an optimum value when generating image data through only the color signal obtained from the color detecting photoelectric converting element, and
the correcting unit is regulating unit regulates the second luminance signal to minimize a difference between the second luminance signal and the first luminance signal generated by the first luminance signal generating unit.

11. The imaging apparatus according to claim 10, wherein the regulating unit regulates by adding, to the second luminance signal, regulation data,
the regulation data is obtained by carrying out a weighting addition, with a given coefficient, over at least three color signals interpolated and generated based on color signals obtained from the at least three types of color detecting photoelectric converting elements respectively in a pixel position corresponding to the second luminance signal acting as a regulating target.

12. The imaging apparatus according to claim 11, further comprising:
a storing unit that stores the given coefficient to minimize the difference every object light source,
wherein the regulating unit regulates a level of the second luminance signal by using the predetermined coefficient which (i) corresponds to the object light source and (ii) is stored in the storing unit.

13. The imaging apparatus according to claim 1, wherein the imaging device includes a first group constituted by the color detecting photoelectric converting elements and a second group constituted by the luminance detecting photoelectric converting elements, and
each of the photoelectric converting elements included in the first group, when a position of each of the photoelectric converting elements included in the second group is set to be a reference, is disposed in a position shifted in a given direction from the reference position in such a manner that one of the photoelectric converting elements included in the first group is adjacent to each of the photoelectric converting elements included in the second group.

14. An imaging apparatus comprising:
an imaging device that includes:
at least three types of color detecting photoelectric converting elements that detect respective color components of a light and output color signals corresponding to the color components, the color components being different from each other; and
a luminance detecting photoelectric converting element that detects a luminance component of the light and output a second luminance signal corresponding to the detected luminance component;
a first luminance signal generating unit that generates first luminance signals corresponding to the color detecting photoelectric converting elements from the color signals; and
a correcting unit that applies a special filter to the first luminance signal and the second luminance signal, a value of a central pixel of the special filter is equal to sum of values in all pixels of the special filter except the central pixel.

* * * * *